FLEXIBLE MATERIAL TRANSPORT MECHANISM

Filed June 8, 1965

10 Sheets-Sheet 1

INVENTOR.
VIVIAN D. KREHBIEL
BY John H. Widdowson
ATTORNEY

INVENTOR.
VIVIAN D. KREHBIEL

BY John H. Widdowson
ATTORNEY

Oct. 10, 1967 V. D. KREHBIEL 3,345,928

FLEXIBLE MATERIAL TRANSPORT MECHANISM

Filed June 8, 1965

10 Sheets-Sheet 3

INVENTOR.
VIVIAN D. KREHBIEL

BY John H. Widdowson

ATTORNEY

INVENTOR.
VIVIAN D. KREHBIEL
BY
John H. Wildowson
ATTORNEY

INVENTOR.
VIVIAN D. KREHBIEL
BY
John H. Widdowson
ATTORNEY

INVENTOR.
VIVIAN D. KREHBIEL
BY
John H. Widdowson
ATTORNEY

Oct. 10, 1967 V. D. KREHBIEL 3,345,928

FLEXIBLE MATERIAL TRANSPORT MECHANISM

Filed June 8, 1965

10 Sheets-Sheet 7

INVENTOR.
VIVIAN D. KREHBIEL

BY John H. Widdowson

ATTORNEY

Oct. 10, 1967 V. D. KREHBIEL 3,345,928

FLEXIBLE MATERIAL TRANSPORT MECHANISM

Filed June 8, 1965 10 Sheets-Sheet 8

INVENTOR.
VIVIAN D. KREHBIEL

BY John H. Widdowson

ATTORNEY

Oct. 10, 1967 V. D. KREHBIEL 3,345,928

FLEXIBLE MATERIAL TRANSPORT MECHANISM

Filed June 8, 1965

10 Sheets-Sheet 9

INVENTOR.
VIVIAN D. KREHBIEL

BY John H. Widdowson

ATTORNEY

Oct. 10, 1967 V. D. KREHBIEL 3,345,928

FLEXIBLE MATERIAL TRANSPORT MECHANISM

Filed June 8, 1965 10 Sheets-Sheet 10

INVENTOR.
VIVIAN D. KREHBIEL

BY John H. Widdowson
ATTORNEY 3,345,928
Patented Oct. 10, 1967

3,345,928

FLEXIBLE MATERIAL TRANSPORT MECHANISM

Vivian D. Krehbiel, P.O. Box 2099,
Wichita, Kans. 67201

Filed June 8, 1965, Ser. No. 462,297
8 Claims. (Cl. 95—94)

This invention relates to a new type of flexible material transport mechanism, and more particularly to a transport mechanism for transporting photographic film or paper through processing, and still more particularly to a machine comprising detachable modular units for processing photographic film or paper.

Apparatus or machines for processing film or paper having a gelatinous coating on one or both sides is well known in the art. The gelatinous coating can be any natural or synthetic hydrophilic organic colloid such as of gelatin, polyvinyl alcohol, or the like. Machines for transporting film or paper through a developing process are well known in the art. These machines consist of tanks for holding, developing, fixing and washing solutions and a transport system continuously moving the film or paper through the solutions and into a drying chamber. Hanger systems for transporting film or paper are well known in the art. Such systems are extremely bulky and require a large amount of floor space. Much time is consumed by the operator of a hanger machine in fixing the film or paper to the hangers and removing them after processing, as well as by the slow movement of the machine.

Machines for transporting sheets of film or paper by rollers are preferable to those transporting by hangers, because they are less bulky and provide a faster transport and allow the film or paper to be transported through a tortuous path thus greatly reducing the floor space necessary for the machine and the time required for processing film or paper. These aspects assume considerable importance where machines are used for the development of X-ray film in hospitals, doctors' offices, and the like. However, the known roller transport systems have not been satisfactory inasmuch as gelatin-coated film or paper when transported through a drying chamber passes through a critical period in which the gelatinous coating becomes tacky. During this period, contact with the rollers of the commercially available transport mechanisms has been responsible for the failure of some of the systems to successfully process photographic film or paper by damage to the gelatinous coating. The present day roller systems utilizing solid elongated rollers develop a squeegee action as the film or photographic paper is being passed between the rollers, building up exhausted chemicals on the surface of the film or paper during its travel in a tank, and especially this is a problem in upward film or paper travel, thus causing imperfections and drying streaks in a developed film or paper. Difficulties have been encountered in maintaining close tolerances in roller transport mechanism. A close tolerance between rollers must be maintained to prevent film or paper from wrapping around a roller. If the rollers are too close to each other, they exert injurious pressure on the film or paper. It has been found necessary in many instances to attach a leader of material having the same thickness as that for which the machine was designed, attaching this leader to a thin film or photographic paper to be passed through the machine. Stationary guide mechanisms are installed in present day roller machines to prevent wrap around, and to direct the passage of film or paper through the machine. These stationary guides tend to scratch or mar the film or paper being processed causing streaks and imperfections to appear after processing. The roller machines requiring close tolerances for efficient operation are expensive to manufacture, difficult to maintain and are adapted only for one thickness of film or paper.

Another difficulty encountered in prior art machines is that it is necessary to purchase a complete machine for any and every developing process desired. It is very difficult to alter or remodel a machine, if it is desired to add an additional processing tank or change the chemical sequence of processing.

The new machine of my invention suitable for processing flexible gelatin-coated film material has a plurality of modular units operatively, interchangeably and detachably connected in series. These include a feed unit and one or more processing units. The feed unit has power means which drives flexible material transport mechanisms in the processing units so that the film is passed through the processing units completely processed.

In a preferred specific embodiment, the machine of my invention for processing flexible material has a plurality of modular units operatively, interchangeably and detachably connected in series. These include a feed unit which has a power source, and at least one processing unit with processing means. The processing unit or units have material transport means mounted in same for transporting flexible material through the processing means. The transport means has spaced roller means mounted on shaft means, with the shaft means mounted generally in spaced rows and staggered in relation to the shaft of the adjacent rows. The roller means are mounted in spaced interlocking relation and in close proximity with adjacent roller means. The transport means is so constructed and adapted that it passes flexible material between the spaced rows of shaft means and roller means through processing and out. There are means connecting the power source with the transport means so that in operation the machine passes flexible material through processing and ejects it in a processed condition.

The new flexible material transport mechanism of my invention has roller means mounted on shaft means, with the shaft means mounted generally in spaced rows and staggered in relation to the shafts of the adjacent rows, and with the roller means being in spaced interlocking relation and in close proximity with adjacent roller means. There are means to rotate the shafts and when so rotated the mechanism is constructed and adapted to transport flexible material through same.

The new flexible material transport mechanism of my invention is easily adapted to transport flexible material through a drying process, as well as through chemical processing tanks, and the like. The drier transport mechanism has roller means mounted on shaft means, with the shaft means being mounted generally in spaced rows and staggered in relation to the shafts of the adjacent row. The roller means is in spaced interlocking relation and in close proximity with adjacent roller means. The rows of shafts are spaced to allow for the insertion of drier means between rows transporting flexible material.

My invention overcomes the disadvantages inherent in photographic film processing machines known to the prior art. The new flexible material transport mechanism which I have invented allows my machine for processing photographic film or paper to be much more compact and smaller than hanger system machines known to the prior art. My machine has separate modular units which are easily detachable and movable and can be arranged in any number of units in series for processing by any method desired, particularly when new chemical processes are made available. Tanks are interchangeable within units. I have provided a film transport mechanism which successfully transports film or paper of a wide range of thickness without injury or imperfections caused by chemical or mechanical failures resulting from the operation of the solid roller transport systems of the prior art. By the interlocking action of the rollers of my invention, film or photographic paper of any thickness and size commonly used in the art can be passed through processing without any danger of wrap around or contact with fixed objects. Film or paper is always transported by the rotating rollers, and the chemicals used in the processing are allowed to freely circulate between roller spaces and not exhaust themselves through build-up against the film or paper resulting from a squeegee action of a solid roller transport system. Since there are no critical tolerances inherent in my transport mechanism, maintenance costs of my machine are minimal.

It is an object of this invention to provide a new machine for processing flexible film material.

It is another object to this invention to provide a new machine for processing exposed photographic film or paper.

Another object of this invention is to provide a new mechanism for transporting flexible material through processing.

Still another object is to provide an exposed photographic film or paper processing machine wherein the film or paper touches only objects which are moving in the direction of the movement of the film or paper.

Still another object of the invention is to provide a machine for processing exposed photographic film or paper that has no exhausted chemical build-up on the film or paper as it is being processed.

Another object of the invention is to provide a machine for processing exposed photographic film or paper which can successfully transport and process all thickness of such film or paper common to the art.

Yet another object of this invention is to provide a machine for processing exposed photographic film or paper comprised of detachable modular units.

And still another object of this invention is to provide a transport mechanism adapted to transporting flexible materials through processing.

And one more object of this invention is to provide a film or photographic paper transport system for a drier.

And another object of this invention is to provide a photographic film or transport mechanism that will not adhere to tacky photographic film or paper.

And a further object of this invention is to provide a machine that will simultaneously process photographic film or paper of any thickness common to the art.

Various other objects and features of the invention will become apparent to those skilled in the art from reading this disclosure.

Drawings accompany and are a part of this disclosure. These drawings depict preferred specific embodiments of the invention for processing photographic film or paper, and it is to be understood that these drawings are not to unduly limit the scope of the invention.

Figure 1:
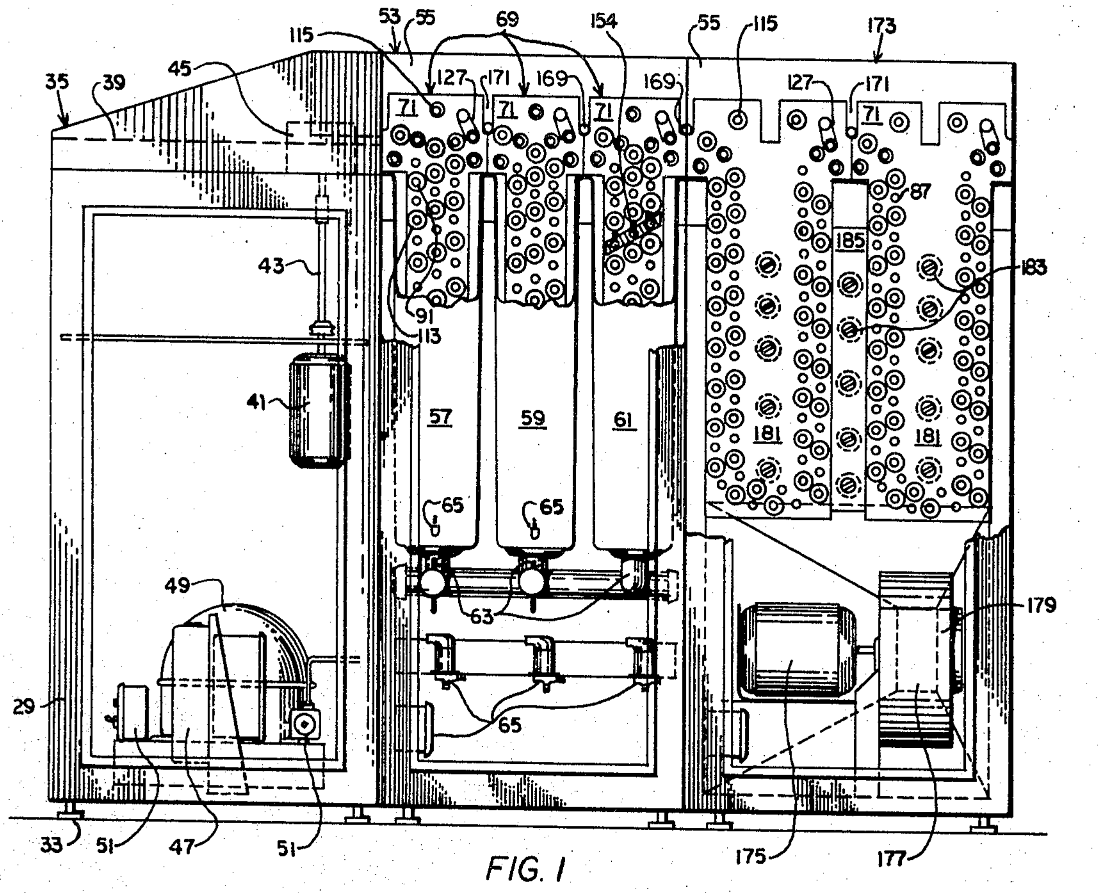
FIG. 1 is a side elevation view partly cut away of a preferred specific embodiment of a basic three tank photographic processing machine of my invention having three modular units, preferably black and white film or paper.

In the following is a discussion and description of the invention, made with reference to the drawings whereon the same reference numerals are used to indicate the same or similar parts and/or structure. The discussion and description is of preferred specific embodiments of the new machine of the invention for processing exposed photographic film or paper, and it is understood that the discussion and description is not to unduly limit the scope of the invention.

A basic film processing machine is generally shown by FIG. 1. This consists of three modular units mounted in series. Each modular unit has a frame. The frame can be made of any strong non-corrosive material such as metal or plastic but preferably of stainless steel. The units have removable side panels 31 which can be made of any suitable material such as metal or plastic, but preferably of the glass fiber reinforced plastics, such as polyester resin, a thermosetting material. The Glidden Company of St. Louis, Missouri is a supplier of a very satisfactory polyester resin, sold under the trademark Glidpol 107. Adjustable legs 33 provide a level support for each unit.

The feed unit 35 has a control panel 37, a feed table 39, a motor 41, a shaft 43, a gear box 45, an aeration timing assembly 47, a refrigerating and heating unit 49 and various electrical controls 51.

Mounted immediately adjacent to the feed unit 35 is a tank unit 53. A removable light tight cover 55 seals the entire unit from light. This cover can be made of any suitable material but preferably of the same material and formed in the same manner as the side panels on the modular units. A developing tank 57, a fix tank 59 and a wash tank 61 are successively mounted in the tank unit 53. Each tank has drain facilities 63. The developing tank 57 and fix tank 59 have aerating means 65 providing for the introduction of a gas to agitate and aerate the solutions in the tanks. These tanks are aerated in timed intervals controlled by the aeration mechanism 47 in the feed unit 35. The developing tank 57 is aerated by any suitable inert gas, preferably nitrogen. The fix tank 59 can be aerated by an inert gas if desired, or by air. The wash tank 61 preferably has provisions for spraying film or paper with fresh water as it passes through the tank. The developing tank 57 contains a developer solution. This solution can be any silver halide reducing agent well known to the art such as pyrogalic acid and the like, but preferably a hydroquinone developer solution. The fix tank 59 contains a solution that dissolves silver halide grains on film or photographic paper. This solution can be any fix solution well known to the art such as sodium thiosulfate, but preferably a sodium thiosulphate with a relatively high pH factor.

Figure 6:
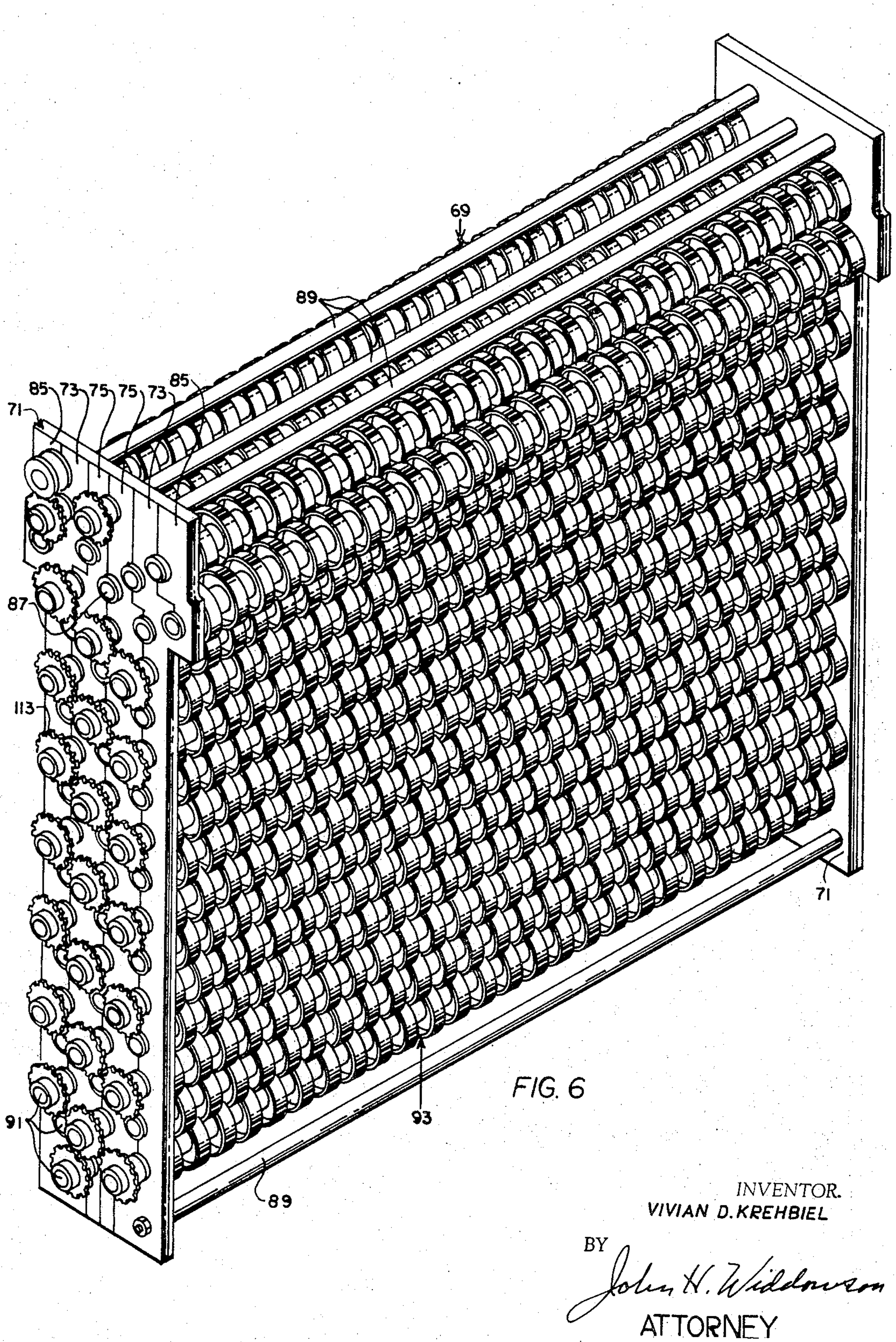
FIG. 6 is a perspective view of a preferred specific embodiment of the transport mechanism of my invention, showing preferred shafts and rollers mounted in segmented end plates with sprockets attached to the shafts.
Figure 7:
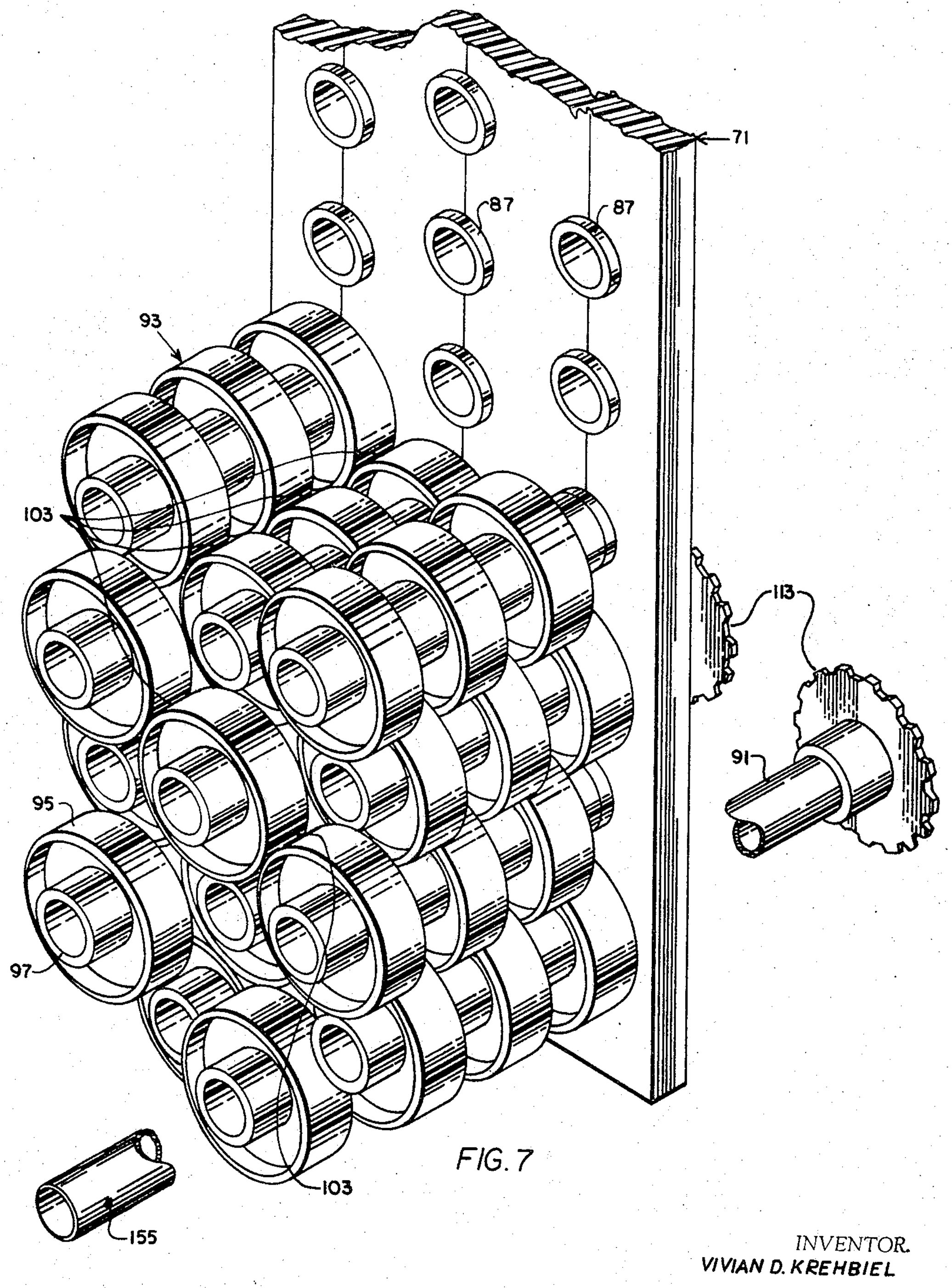
FIG. 7 is an enlarged perspective view of same partly cut away and partly in cross section showing the preferred specific embodiments of the segmented end plates, shafts mounted therein and spaced rollers mounted on the shafts of the transport mechanism.
Figure 10:
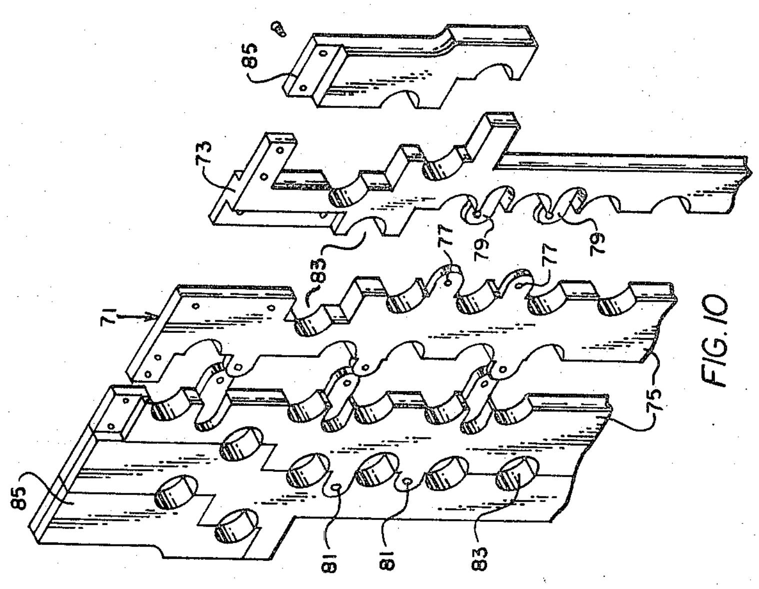
FIG. 10 is an exploded and enlarged perspective view partly cut away of a portion of a segmented end plate of same showing preferred tabular construction.

Each of the tanks contains the film transport mechanism of my invention shown generally at FIG. 6. This transport mechanism has two end plates 71. The end plates 71 can be made of any non-corrosive hard substance such as plastic, metal or the like, but preferably of polyepoxide or glass fiber reinforced polyester resin which are thermosetting materials. Fibercore which is a commercial polyester resin, has been found to be very satisfactory material for end plates 71 and can be purchased from the Plumb Chemical Company of Philadelphia, Pa. The end plates 71 are formed in segments. FIG. 10 shows an outside segment 73 and an inside segment 75. The inside segments 75 are formed with tabs 77 which fit into a recess on an adjoining segment and when so fitted can be fastened by screws 81. Any number of inside segments 75 can be utilized in a given end plate as desired. The half moon recesses form a shaft support hole 83 when the segments 73 and 75 are mounted to each other. The outside segments 73 are attached by the tabs 77 and screws 81 to inside segments 75. Feed and ejection shaft segments 85 are attached in the same way at the top of the end plates. Bearings 87 as shown on FIG. 7 are mounted in the shaft holes 83 in the end plates. These bearings 87 can be made of any suitable bearing material which is non-corrosive in photographic processing solutions such as metal or plastic but preferably of a polyolefin, such as linear polyethylene, a thermo-forming plastic. It has been found that Marlex polyethylene which is available from Phillips Petroleum Corporation, Bartlesville, Oklahoma, makes a very satisfactory bearing. The end plates are held rigidly together by rods 89. These rods can be made of any suitable material which is non-corrosive in photographic processing solutions such as metal or plastic, but preferably of type 316 stainless steel tubing.

Figure 25:
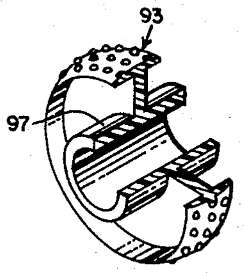
FIG. 25 is a perspective view partially cut away of a preferred crowned knobbed roller.
Figure 21:
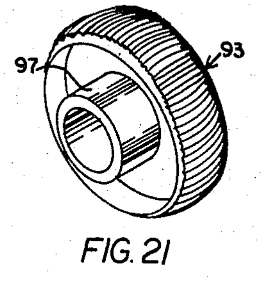
FIG. 21 is a perspective view of a preferred roller, being crowned and axially grooved.
Figure 22:
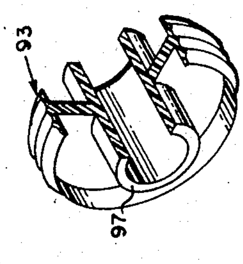
FIG. 22 is a perspective view partially cut away of a preferred circumferentially grooved roller.
Figure 23:
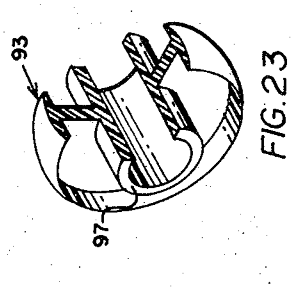
FIG. 23 is a perspective view partially cut away of a preferred crowned roller having a smooth face.
Figure 24:
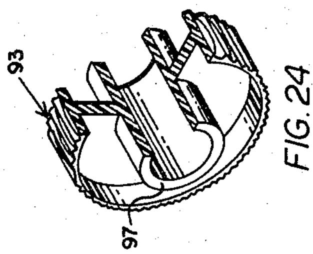
FIG. 24 is a perspective view partially cut away of a preferred axially ribbed roller.

Shafts 91 are mounted in the bearings 87 and project through each end plate 71. These shafts 91 can be made of any hard material non-corrosive in photographic processing solutions such as metal or plastic but preferably also of type 316 stainless steel tubing. A plurality of rollers referred to generally on FIG. 7 at 93, are concentrically mounted in a row on the shafts 91. These rollers can be made in any suitable manner, such as by injection molding, out of any suitable material, such as rubber, rubber-like material, plastic, metal, or the like, but preferably of such as ethylene, vinyl acetate copolymer resin. It has been found that Ultrathene ethylene, vinyl acetate resin distributed by U.S. Industrial Chemicals Company of St. Louis, Mo., produces a satisfactory roller. Each roller has a face portion 95 and an elongated hub portion 97. The hub portion spaces the rollers 93 on the shafts 91 so that the distance between faces 95 of adjacent rollers is preferably slightly greater than the width of the face of the rollers 95. The faces of the rollers 95 can be flat as shown in FIG. 7, or crowned as shown in FIG. 23, circumferentially grooved as shown in FIG. 22, crowned and axially grooved as shown in FIG. 21, axially grooved as shown in FIG. 24 or knobbed as in FIG. 25. It has been found in practice that a crowned knobbed roller as shown in FIG. 25 is very satisfactory in use, because this type of facing presents the least contact area to photographic film or paper as it is being passed through the transport mechanism 69.

Figures 8, 9:
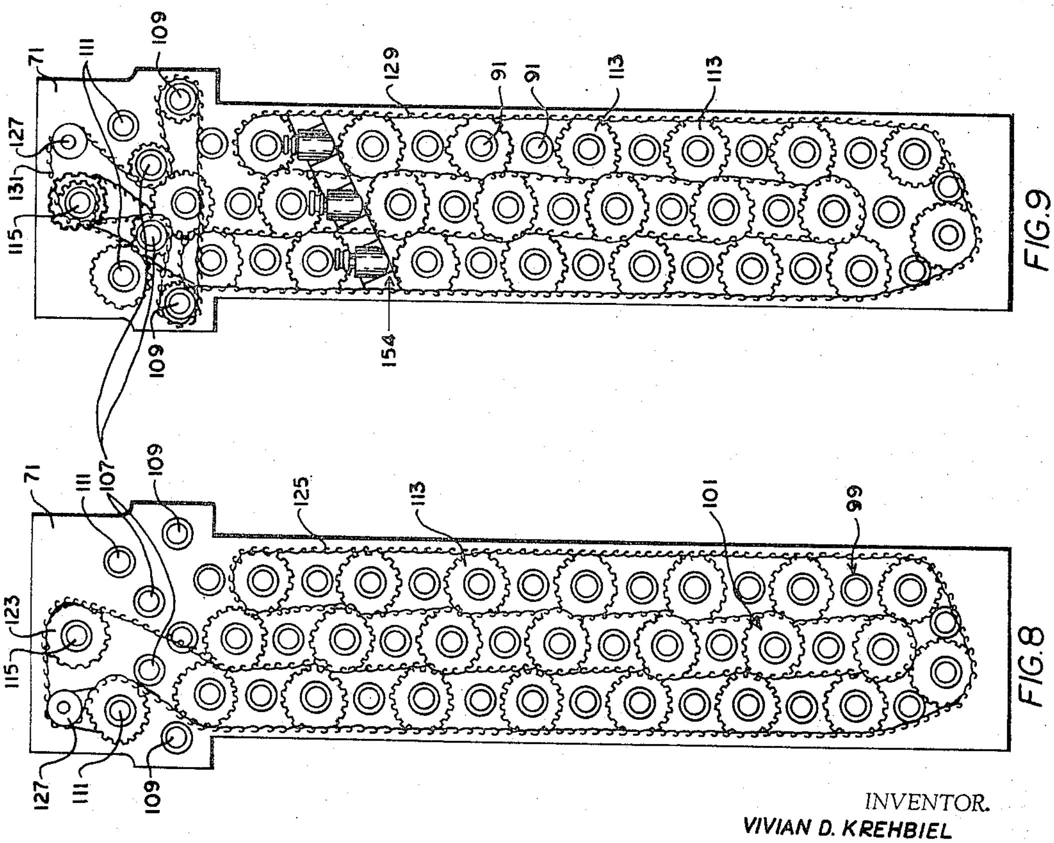
FIG. 8 is an end elevation view of same showing the positioning of shafts and sprockets mounted thereon and a preferred drive chain arrangement.
FIG. 9 is an end elevation view of the other end of same, and also showing preferred wash means and feed and ejection drive means.
Figure 11:
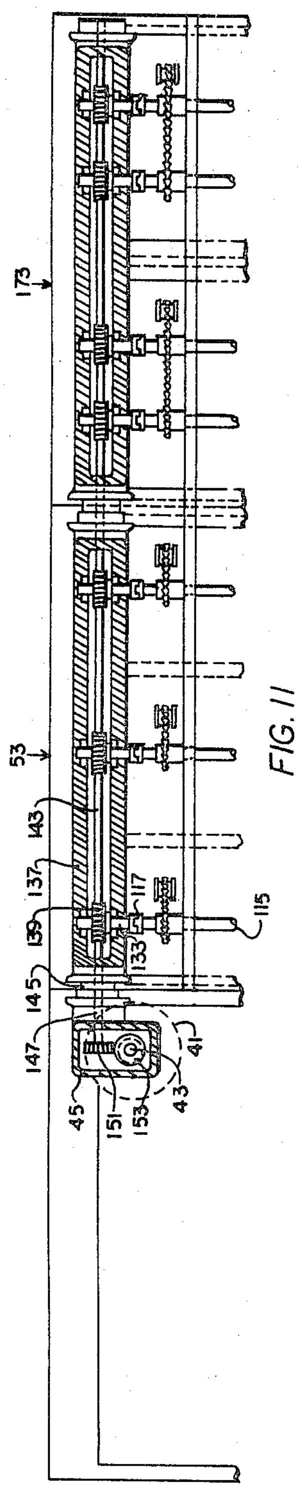
FIG. 11 is a top plan view partially cut away of preferred drive gearing mounted on the modular units.
Figure 15:
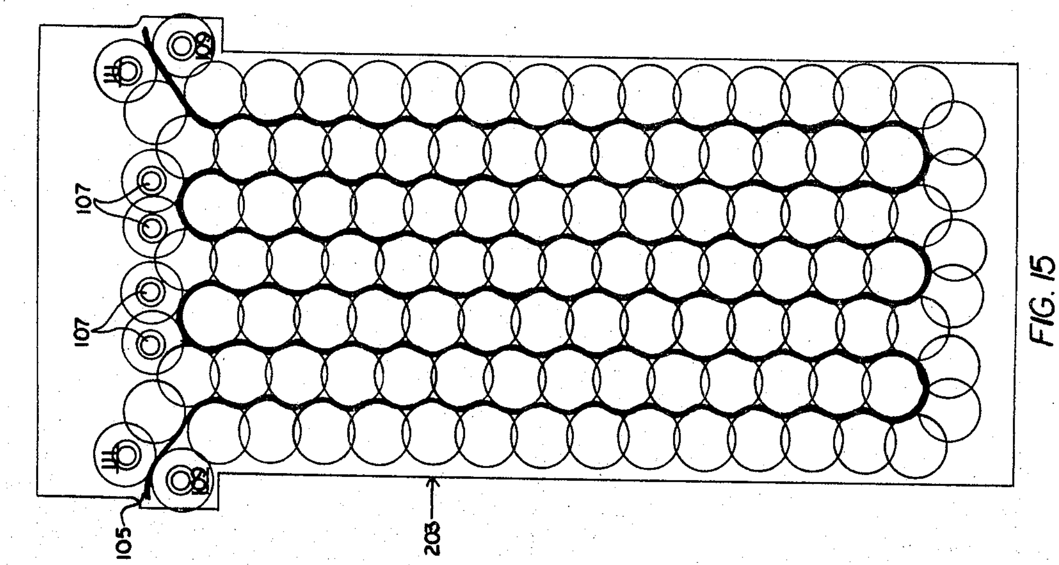
FIG. 15 is an end elevation schematic view of a preferred three pass transport mechanism.
Figure 14:
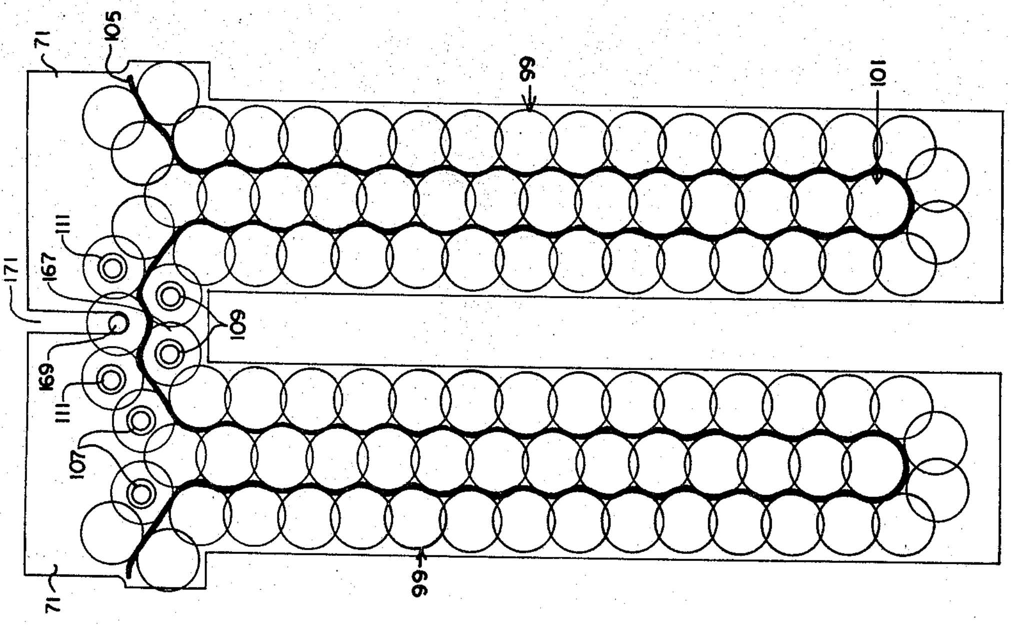
FIG. 14 is an end elevation schematic view of adjacent transport mechanisms showing preferred passage of film or paper through the transport mechanism and through the crossover between the transport mechanisms.

The shafts 91 are placed in the lower portions of the segmented end plates 71 in a generally symmetrical U-shaped pattern as best shown in FIGS. 14 and 15, shown generally at 99. The shafts 91 in the U-shaped pattern row 99 are spaced, and have rollers 93 thereon spaced so that the faces of rollers 95 on one shaft project into the spaces between rollers 95 of the adjoining shaft 91 so as to prevent film, paper or flexible material from escaping or wrapping around any roller. A vertical row 101 of inside shafts each with rollers thereon is positioned in the end plates 71 is staggered relation to the adjoining shafts of the legs of the U-shaped pattern of shafts 99. The rollers 93 on the shafts 91 in this row 101 interlock with each other in the same manner as the rollers 93 of the outside shafts 99. The inside row 101 of shafts 91 with rollers 93 have roller faces 95, each of which is in close proximity with the face 95 of a roller on each outside shaft as shown at points 103 of FIG. 7. The distance between the faces 95 of the rollers 93 at these points 103 can be any suitable distance so as to pass film or paper through the mechanism. It has been found in practice however that a distance of between 20 to 40 thousandths of an inch produces satisfactory results, but preferably a distance of about 35 thousandths of an inch. This positioning of the shafts and rollers causes flexible material 105 to pass through the mechanism in a weaving manner. Directing shafts 107 (FIGS. 8 and 9) with rollers 93 thereon are positioned in the top part of the end plates 71. The rollers 93 on the directing shafts 107 interlock with the rollers 93 on the top most shaft of the inside row 101 and are in close proximity with the rollers 93 of the top most shafts of the U-shaped pattern of shafts 99. Outside feed or ejection shafts 109 (FIGS. 8 and 9) have rollers 93 thereon that interlock with the rollers 93 of the top most shaft 91 of the U-shaped pattern of shafts 99. Inside feed or ejection shafts 111 (FIGS. 8 and 9) have rollers 93 thereon that interlock with the rollers 93 of the directing shafts 107 and they are in close proximity with the rollers 93 of the outside feed or ejection shafts 109.

Any means connected to a power source can be used to turn the shafts such as belts, gears or the like, but preferably chains and sprockets. A sprocket 113 is mounted on one end portion of each shaft 91 outside the end plates 71. The sprockets 113 can be made in any suitable manner such as by injection molding out of any suitable material such as metal, plastic or the like but preferably of a plastic. It has been found that either an acetal copolymer marketed by the Celanese Polymer Company of Newark, N.J., as Celcon, or Marlex polyethylene make a satisfactory part. The sprockets 113 are mounted on every other projecting shaft 91 on the outside of each end plate 71.

Figure 12:
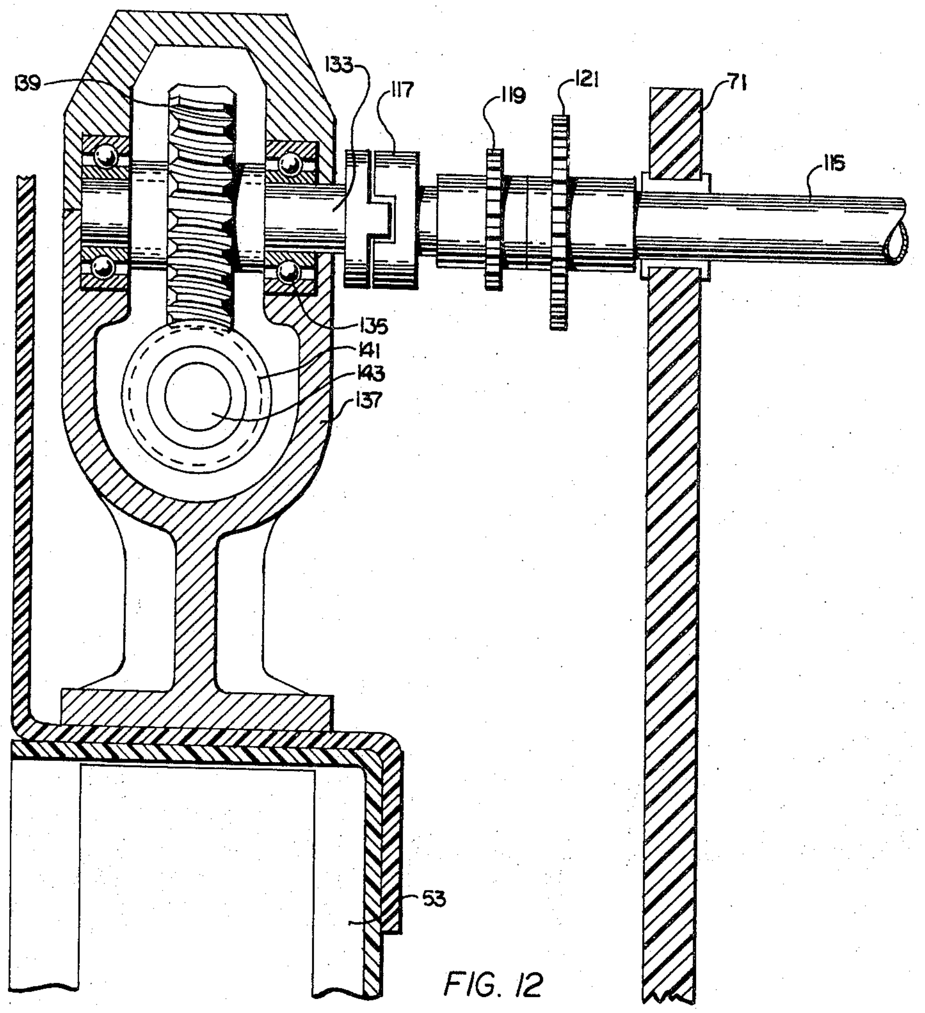
FIG. 12 is an enlarged partial cross section of the preferred drive gearing.

A drive shaft 115 (FIG. 12) is mounted in the top portion of the end plate 71 and projects through each end plate 71. This shaft is preferably made of the same material as the other shafts 91. A coupling is mounted on one end portion of the drive shaft 115. A first drive sprocket 119 is mounted next to the coupling 117, a second drive sprocket 121 is mounted adjacent to the first drive sprocket and near the end plate 71, and a third drive sprocket 123 is mounted on the other end portion of the drive shaft 115. The first drive sprocket 119 can be mounted on either end portion of the drive shaft. A chain 125 is mounted on the sprockets 113 and the third drive sprocket 123 at one end of the mechanism 69. Chain idler pulleys 127 are preferably mounted on end plates 71 to hold the chains sufficiently taut to turn the sprockets 113. A corresponding chain 129 is mounted on second drive sprocket 121 and the sprockets 113 at the other end of the mechanism 69.

A third chain 131 is mounted on sprocket 119 and like sprockets mounted on feed and ejection shafts. Coupling 117 is mounted on a shaft 133 which is mounted by bearings 135 in a gearing housing 137 which is mounted along a top side portion of a modular unit 53. A gear 139 is mounted on the shaft 133 and engages a worm gear 141 which is mounted on a worm gear shaft 143. Shaft 143 has a coupling 145 on the end portion which is connected to another shaft 147 mounted in gear box 45 on feed unit 35. A gear 151 is mounted on shaft 147 and engages a worm gear 153 mounted on motor shaft 43 which is connected to the motor 41 in the feed unit 35.

Figure 13:
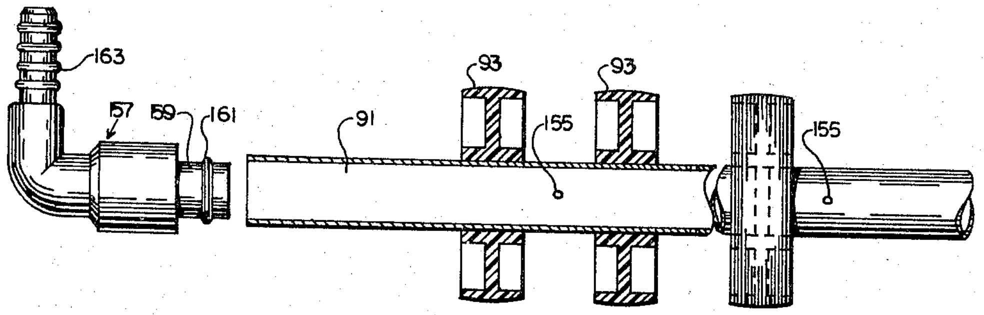
FIG. 13 is a longitudinal view partly in cross section of preferred washing apparatus and structure for the wash tank units.

A washing facility 154 is provided in connection with wash tank 61. Three or more of the shafts 91 in the transport mechanism 69 mounted in a wash tank 61 have holes 155 spaced between the rollers 93 (FIG. 13). A water fitting 157 has a shaft end 159 which is inserted in the end of a projecting shaft 91 with the shoulder 161 loosely engaging the interior of shaft 91, so as to allow the shaft 91 to rotate and the water fitting 157 to remain stationary. Water fitting 157 can be made of any suitable hard non-corrosive material such as metal or plastic, but preferably of plastic. Marlex has been found to make a very satisfactory water fitting. Water is supplied by a hose (not shown) from a water source manifold 165 (FIG. 2) to hose connection 163, so that water is sprayed on film or paper through holes 155 as the film or paper is being passed through the transport mechanism 69.

Tanks 57, 59 and 61 are mounted immediately adjacent to each other in series in the tank modular unit 53. A transport mechanism 69 is mounted in each tank with the transport mechanisms 69 containing the washing means aforesaid being mounted in wash tank 61. When so mounted the rollers of outside feed and ejection shafts 109 of adjacent mechanisms interlock as depicted at point 167 in FIG. 14. A crossover shaft 169 with spaced rollers mounted on it, fits in a slot 171 between end plates 71, and its rollers rest on the rollers of shafts 109. The rollers on the crossover shaft 169 interlock with the rollers of the inside feed and ejection shafts 111. Crossover shaft 169 is turned by the rotation of shafts 109, and guides film or paper 105 so that it will pass from one transport mechanism 69 to an adjacent transport mechanism 69. In operation the motor 41 in feed unit 35 provides rotation through the various gear drives through shaft 43, gear box 45, shaft 143 and shafts 133 to power shafts 115, rotating all shafts 91 on all mechanisms 69 so that shafts of U-shaped pattern 99 rotate in a direction opposite from the rotation of the shafts in the vertical row 101, with shafts 111 rotating in the opposite direction from the rotation of shafts 109 passing film or paper 105 through the tanks 57, 59 and 61 and ejecting same.

Figures 19, 20:
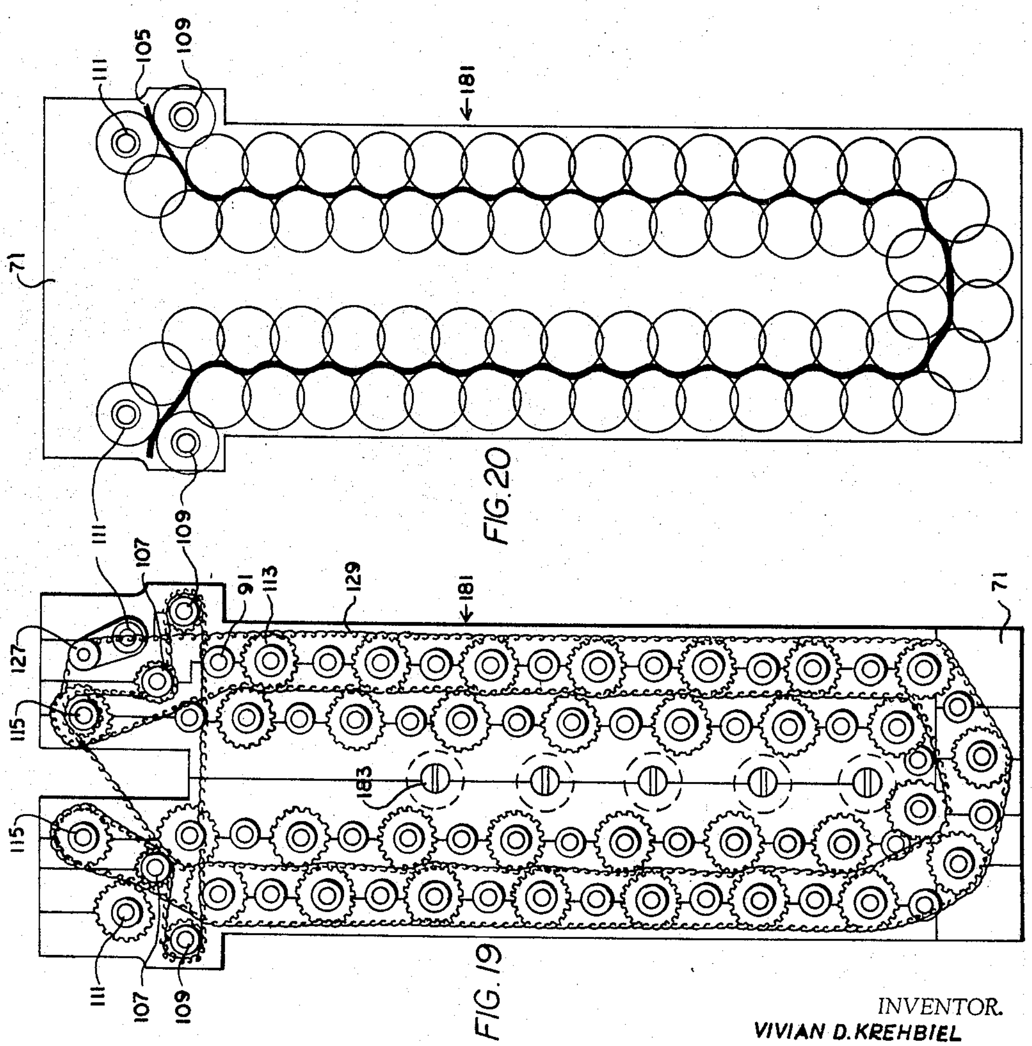
FIG. 19 is an end elevational view of a preferred drier transport mechanism, having incorporated therein the drier means of FIG. 18.
FIG. 20 is a schematic view of a preferred drier mechanism showing preferred passage of film or paper through same.

A drier modular unit shown generally by 173, is attached adjacent to and in series with the tank modular unit 53. A motor 175 is mounted in the base of the unit and connected to a blower 177. A duct 179 conducts air from the blower. Two drier transport mechanisms 181 are mounted in the unit. The component parts of the drier transport mechanism 181 are substantially the same as the parts of the already described transport mechanism 69. The end plates 71 are segmented and made of the same material, the shafts 91, bearings 87, sprockets 113 and gearing are preferably the same, feed 109 and ejection 111 means are desirably identical. It has been found however that Marlex or other linear polyethylene resin is the more satisfactory material for rollers in the drier transport mechanism because rollers made of Marlex do not adhere to a tacky film or paper as it is being passed through the drier. I have also found that it is advantageous to position the shafts differently maintaining, however, the same interlocking, spaced and close proximity relationships. Referring to FIGURES 19 and 20, each drier transport mechanism has the shafts 91 positioned in two adjacent rows in a U-shaped pattern near the outside edge of the end plates 71. The rollers 93 on each shaft 91 in a row interlock with the rollers 93 of each adjoining shaft 91 in that row. The shafts 91 of the adjoining U-shaped patterns are in staggered relation to each other so that the rollers 93 on each shaft 91 of the inside row are in close proximity with the rollers 93 of the shaft 91 of the outside row. Similar chains, coupling and drive shafts preferably rotate the shafts 91, etc. It has been found that this arrangement of the shafts 91 in the U-shaped pattern with a space between the legs of the U is quite advantageous for a drier mechanism.

Figure 18:
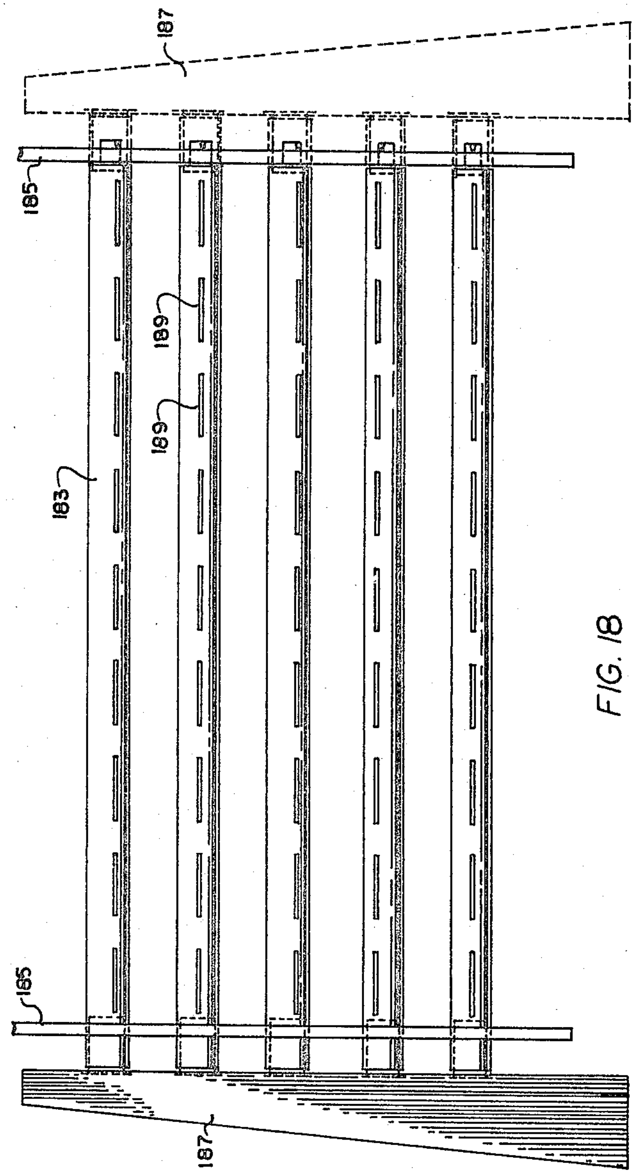
FIG. 18 is an elevational view of preferred drier means for use in a drier unit.

Any means can be used to introduce air into the drier mechanism to dry film or paper. It has been found however that very satisfactory results in the drying process have been achieved by mounting a plurality of hollow tubes 183 (FIG. 18) in and between the end plates 71 and positioning them in a vertical row between the legs of the U-shaped pattern of the transport mechanism 181. Similar hollow tubes 183 are also mounted between adjacent transport mechanisms 181 in an end plate 185 provided for same. The tubes 183 can be made of any suitable hard substance such as metal or plastic but preferably of 606126 grade aluminum. Each tube has slots 189 spaced longitudinally along its surface. Air is conducted from the blower duct means to ducts 187. Air is conducted under pressure from blower 177 through the duct means 179 and 187 into the hollowed tubes 183, out through slots 189 and into the film or paper, drying the film or paper being passed by the transport mechanism 181 on both sides of the tubes 183.

Figure 16:
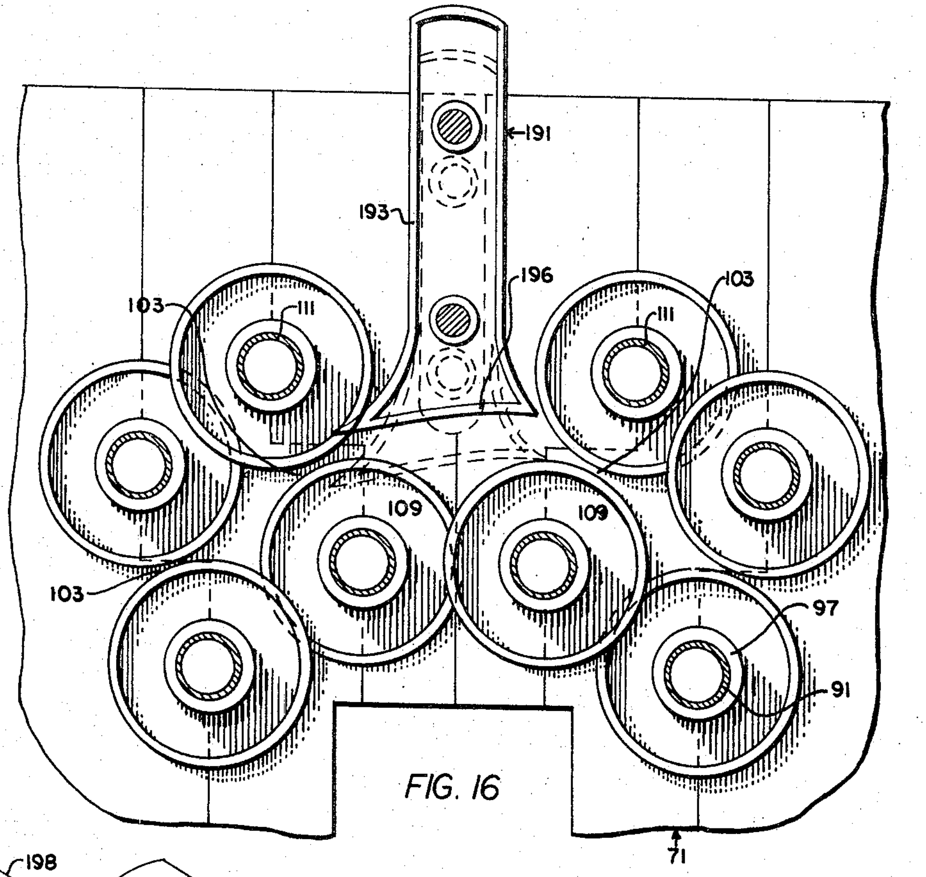
FIG. 16 is an enlarged side elevation view of a preferred crossover means between transport mechanisms and inspection means inserted therein to remove or paper for inspection.
Figure 17:
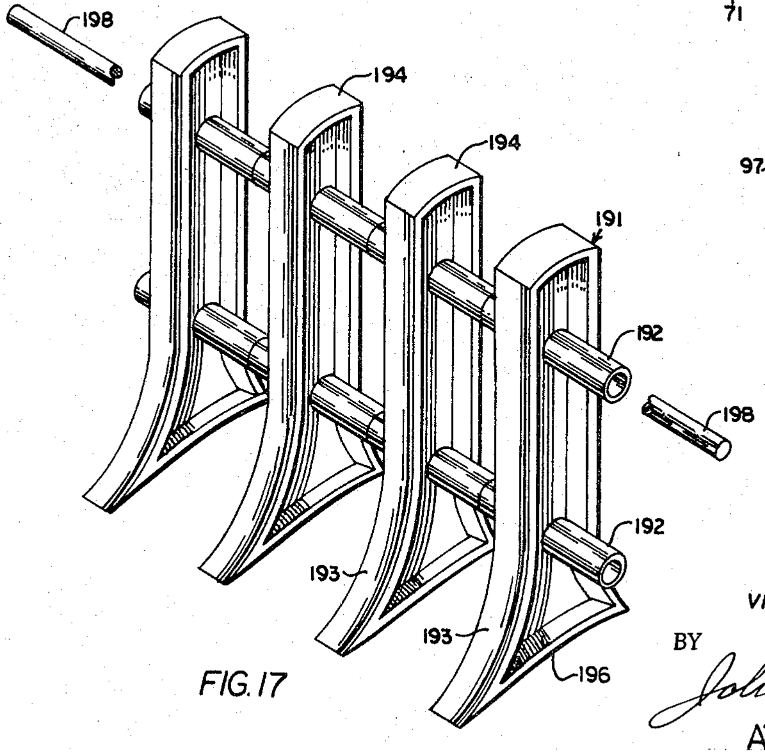
FIG. 17 is a perspective view of the inspection means of FIG. 16.

It is sometimes desirable to remove film or photographic paper from the machine during processing for inspection purposes. Referring to FIGS. 16 and 17 an inspection device 191 is shown which can be substituted for the crossover shaft with rollers 169. The inspection device 191 comprises two hollow shafts 192 spaced in parallel relation upon which are mounted a series of inspection inserts 194 which have smooth curving sides 193. The parts of the inspection device 191 can be made of any suitable material which is non-corrosive in photographic processing solutions such as metal or plastic, preferably of 316 stainless steel. When the inspection device 191 is in the raised position as shown in FIG. 16, film or paper 105 comes in contact with the bottom portion 196 of the device 191, if at all, and is directed into the feed rollers of the adjacent transport mechanism 69. In the lowered position, as shown by the broken lines on FIG. 16, the end portions of the bottom portion 196 rest on the rotating rollers 93 of feed and ejection shafts 109 of the adjacent mechanisms, and the film or paper 105 is passed up a side 193 of the inserts 194 for removal and inspection, and reintroduction on the other side thereof, if desired. The device 191 is raised and lowered by projecting rod 198 which is inserted in the hollow shaft 192.

Figure 2:
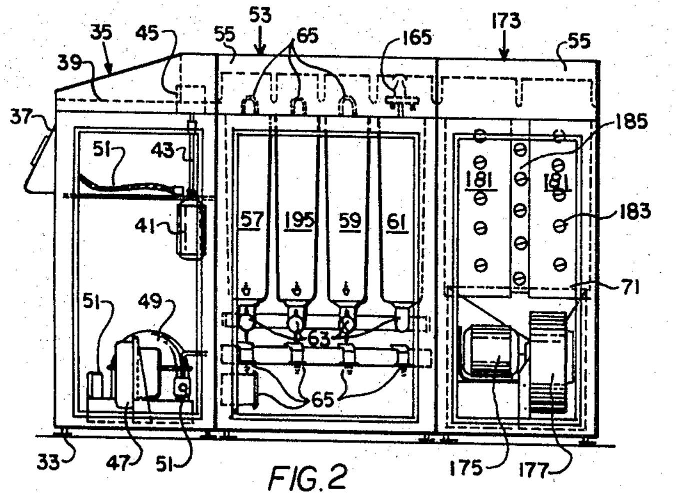
FIG. 2 is a side elevation view partly cut away of the machine shown in FIG. 1 with an additional processing tank in the tank unit.

At FIG. 2 of the drawings is shown a photographic film or paper processing machine designed especially for another development system for graphic arts emulsions. This machine is like the machine of FIG. 1 but has a short-stop fix tank 195 mounted between the developer tank 57 and the fix tank 59. This tank 195 is identical to the developer tank 57 and has an identical transport mechanism 69 mounted therein. An acetic acid solution is normally used for stopping the development process and is preferably used in the stop fix tank 195. However, any other satisfactory solution that will stop a development process can be used in the tank 195. This machine processes photographic film or paper and particularly graphic arts emulsions, and ejects them processed and matte dried.

Figure 3:
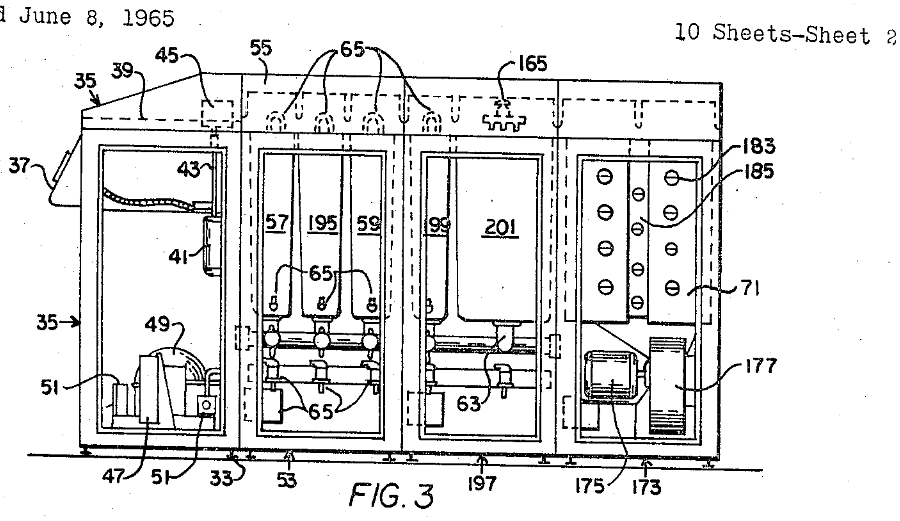
FIG. 3 is a side elevation view partly cut away of a preferred specific embodiment of a photographic processing machine of my invention for processing continuous film or paper, preferably black and white film or paper.

At FIG. 3 is shown a machine for processing photographic film or paper, but especially adapted for processing black and white continuous film or paper to a matte dry finish. This machine has an identical feed unit 35, tank unit 53, and drier unit 173. It has, in addition, a third unit 197 mounted between the tank unit 53 and the drier unit 173. Tank unit 53 has in series an identical developer tank 57, stop bath tank 195 and fix tank 59. Tank unit 197 has a hypo eliminator tank 199 and a three pass wash tank 201 mounted in series. Tank 199 is identical to the foregoing tanks except it contains a hypo eliminator solution. A suitable hypo eliminator solution converts some of the by-products of development, which are slightly acid into harmless salts that are more readily soluble in water. The Eastman Kodak Company of Rochester, N.Y., supplies a satisfactory hypo eliminator solution. The three pass wash tank 201 mounted adjacent to tank 199 is the same as the other tanks with the exception it is larger and it contains a three pass film transport mechanism 203. The three pass film transport mechanism 203 (FIG. 15) is identical to the one pass transport mechanism 69 except that there are additional inside segments 75 in the end plates 71 and additional shafts 91 with rollers 93 mounted through and between the end plates 71, and additional vertical rows 101 and U-shaped patterns 99.

Adjacent U-shaped patterns 99 have common legs. Additional directing shafts with rollers 107 direct the film or paper 105 into the next pass. Additional washing facilities 154 are provided. An identical drier unit is mounted adjoining tank unit 197 and matte dries the film or paper after it has been passed from the feed unit by the transport mechanism through developer tank 57, stop bath tank 195, fix tank 59, hypo eliminator tank 199, and wash tank 201.

Figure 4:
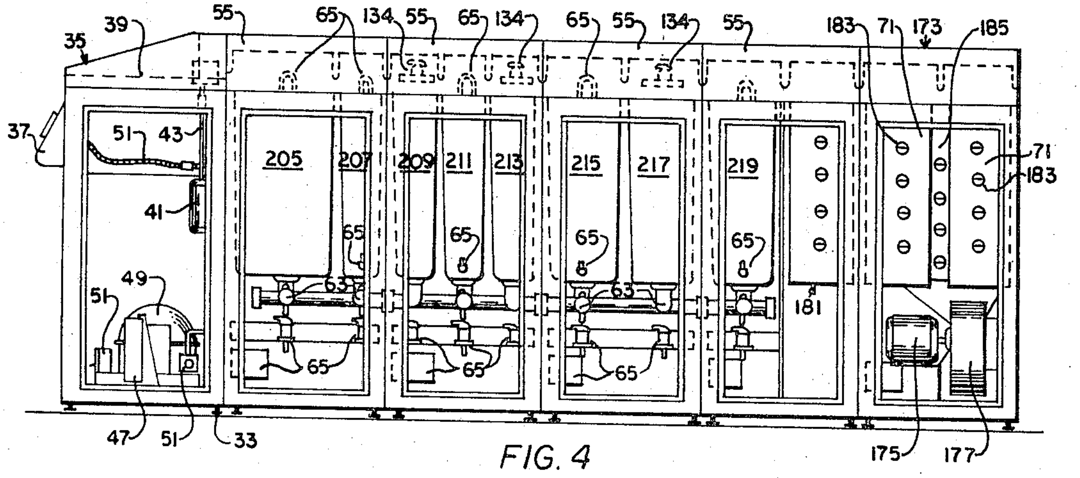
FIG. 4 is a side elevation view partly cut away of a preferred specific embodiment of a photographic processing machine of my invention for processing color film.

As can be seen from the foregoing, a processing machine can be made up of any combination of modular units and is readily adaptable to any processing chemical requirement. FIG. 4 depicts a combination of units which is designed for processing color film according to the processing steps specified by the Eastman Kodak Company, Rochester, N.Y., in their P–122 processing for color film. Other processing common to the trade can readily be used. In this machine the modular units are the same, the drives are the same, and the tanks are the same except where two passes through a solution are desired. The two pass tanks are large enough to accommodate a two pass transport mechanism which is identical with the other transport mechanisms 59 but has additional inside segments 75 mounted in the end plate 71 and additional shafts with rollers, all as hereinbefore described to pass the film or paper through the tank twice. The processing tanks in the color machine of FIG. 4 are in order, a three pass developer tank 205, a stop bath tank 207, a wash tank 209, a bleach tank 311, another wash tank 213, a two pass hardener fix tank 215, a two pass wash tank 217 with additional wash means, and a two pass buffer stabilizer tank 219. Adjacent to tank 219 in its module is a one pass drier mechanism 181, which connects with the drier unit. The chemicals used in the various tanks are those prescribed by Eastman Kodak Company in their P–122 processing recommendations. This machine will process photographic color film or paper by passing the film or paper from the feed unit by means of transport mechanisms through the various tanks and driers and eject it dried and processed.

Figure 5:
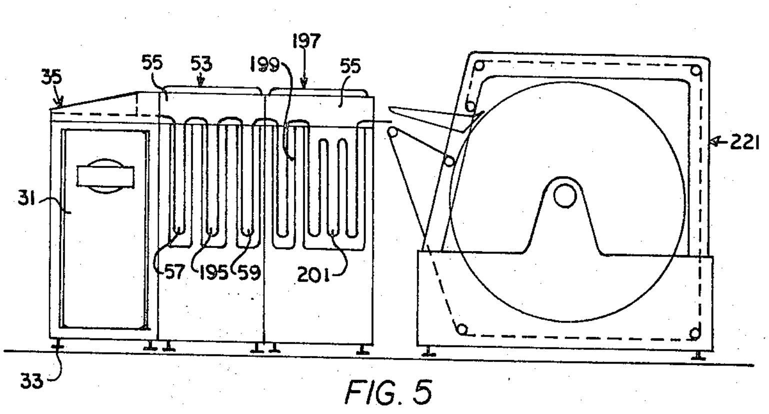
FIG. 5 is a side elevation view of a preferred specific embodiment of a photographic processing machine of my invention having a gloss drier therewith.

To further show the adaptability of the transport mechanisms and the detachable modular unit construction, FIG. 5 shows a processing machine similar to the one shown at FIG. 3. This machine has, however, a gloss drier 221 well known to the art positioned to receive wet film or paper from the last tank unit, instead of the matte drier unit 173 as shown in FIG. 3.

The foregoing discussion and description has been made in connection with only the preferred specific embodiments of the machine for processing photographic film or paper of the invention. However, it is to be understood that the discussion and description is only intended to illustrate and teach those skilled in the art how to practice the invention, and such is not to unduly limit the scope of the invention, which is defined in the claims set forth hereafter.

I claim:

1. A machine for processing exposed gelatin-coated film or photographic paper comprising, a plurality of modular units operatively, interchangeably and detachably connected in series, each of said units having a frame, panels mounted on said frame and adjustable legs mounted on said frame and supporting said unit, (1) a feed unit having mounted thereon a control panel, means for feeding film, a motor drivingly connected to a shaft and gear means, an aeration timing assembly, a heating and cooling means and electrical means, (2) a tank modular unit having a removably light tight cover, a developing tank, a hypo tank and a wash tank successively and operatively mounted therein in series, each of said tanks having drain means, said developing tank and hypo tank having aerating means, means connecting said aerating means and said aeration timing assembly, and said timing assembly constructed and adapted to activate said aerating means, said wash tank having wash means, and each of said tanks having (3) a removably mounted photographic film or paper transport mechanism having two vertically segmented end plates having at least four interlocking and overlapping tabbed segments removably connected by screw means and supporting, when so connected, a plurality of horizontally disposed hollow shafts mounted between and projecting through said end plates, said end plates connected by rods mounted thereon, a plurality of spaced rollers concentrically mounted on each of said shafts to turn therewith, the said rollers having knobbed faces, said shafts having said rollers positioned generally in an elongated symmetrical U-shaped pattern near the outside edge of said end plates with the rollers on each shaft in spaced interlocking relation with the rollers on each adjoining shaft, thereby the rollers on each shaft projecting into the spaces between the rollers on each adjoining shaft and the shafts along the legs of said U being directly opposed to each other in horizontal relation, an inside vertical row of like and spaced shafts having like and spaced rollers concentrically mounted thereon and centered between the legs of said U-shaped pattern and each shaft thereof centered on a horizontal plane drawn midway between the centers of opposite shafts in the said U-shaped pattern adjacent thereto, the face of each roller on said inside shafts being in close proximity with the face of a roller on an outside shaft, and each of said rollers mounted on the said inside shafts describing an arc in an imaginary vertical plane drawn tangent to the innermost points of the circles described by the rollers mounted on the said outside shafts, said rollers on the said inside vertical row of shafts spaced in interlocking relation with the rollers on each adjoining shaft in said inside row, and the rollers on each shaft of said vertical row projecting into the spaces between the rollers on each adjoining shaft of said vertical row, two spaced directing shafts having spaced rollers mounted thereon like the rollers aforesaid and positioned near the top portion of said end plates and mounted between said end plates in directly opposed horizontal relation, the said rollers on said directing shafts interlocking in like manner with the rollers mounted on the top most shaft of the said inner vertical row and in like close proximity with the rollers of the top most mounted shafts of the said U-shaped pattern, an outside and an inside opposed spaced feed shafts having spaced rollers mounted thereon like said rollers aforesaid and mounted between said end plates in the top side portion of same, said rollers of said feed shafts interlocking in like manner with the rollers on the next adjacent shaft, said rollers on one of said feed shafts in like close proximity with said rollers of the other feed shaft, an inside and an outside opposed ejection shafts having spaced rollers mounted thereon like said rollers aforesaid and mounted between said end plates in the other top side portion of said end plates, said rollers on said ejection shaft interlocking in like manner with the rollers on the next adjacent shaft, said rollers on one of said ejection shafts in like close proximity with said rollers of the other ejection shaft, every other one of the projecting end portions of the shafts in each end of said transport mechanism having a sprocket removably mounted thereon and secured thereto to turn the shaft, a drive shaft centrally mounted between said end plates in the top portion thereof and projecting through same, a separable coupling mounted on one projecting end of said drive shaft, a first drive sprocket mounted on said drive shaft adjacent to said coupling and on the inside thereof, a second drive sprocket mounted on said drive shaft adjacent to said first drive sprocket, a third drive sprocket mounted on the other projecting end portion of said drive shaft, a chain drivingly mounted on said third drive sprocket and on said sprockets mounted on the end portions of the shaft projecting through one of the end plates, another corresponding chain drivingly mounted on said second drive sprocket and the sprockets mounted on the end portions of the shafts projecting through the other of the end plates, to rotate all of the shafts with the shafts of the inside vertical row rotating in an opposite direction from rotation of the shafts of the said U-shaped pattern, a chain drivingly mounted on the said first drive sprocket and said sprockets mounted on the projecting end portions of the said feed shafts and the said ejection shafts to rotate one of said feed shafts in a direction opposite to direction of rotation of the other feed shaft, and to rotate one of said ejection shafts in a direction opposite to the direction of rotation of the other ejection shaft, gearing mounted on said tank unit, said gearing drivingly connected to said gear means of said feed unit, said coupling drivingly connected to said gearing on said tank unit, said tanks with said transport mechanisms mounted therein positioned immediately adjacent to each other in said modular unit, the rollers of said outside ejection shaft interlocking in like manner with the rollers of said outside feed shaft of the adjacent transport mechanism, a crossover shaft having spaced rollers mounted thereon removably mounted between adjacent end plates of transport mechanisms and on adjacent outside feed and ejection rollers and interlocking in like manner the rollers of said adjacent inside feed and inside ejection roller shafts of adjacent film transport mechanisms, and (4) a drier modular unit for producing matte photographic reproductions having a motor mounted thereon, an air blower mounted thereon, said air blower drivingly connected to said motor, means to conduct air to film or paper for drying same, a removable light tight cover, a removably mounted film transport drier mechanism having two vertically segmented end plates having a plurality of interlocking and overlapping tabbed segments removably connected by screw means and supporting, when so connected, a plurality of horizontally disposed hollow shafts mounted between and projecting through said end plates, said end plates connected by rods mounted thereon, a plurality of spaced rollers concentrically mounted on each of said shafts to turn therewith, said shafts having said rollers positioned in two adjacent rows in a U-shaped pattern near the outside edge of said end plates, with each shaft having said rollers in spaced interlocking relation with each adjoining shaft in its row thereby the rollers on each shaft in a row projecting into the spaces between the rollers on each adjoining shaft in said row, the rows of shafts positioned in close proximity and in staggered relation to each other, each of the said rollers mounted on shafts in one row describing an arc in an imaginary plane drawn tangent to the nearest points of the circles described by the rollers of the shafts of the said adjacent row, two directing shafts having spaced rollers mounted thereon like the rollers aforesaid and positioned in the top portion of said end plates and mounted in and projecting through said end plates in directly opposed horizontal relation, the rollers of one of said directing shafts interlocking in like manner with the rollers of one of the topmost mounted shafts of the inside U-shaped pattern and the rollers of the other of the directing shafts interlocking in like manner with the rollers of the other of the topmost mounted shafts of the said inside U-shaped pattern, an inside and an outside opposed feed shaft having spaced rollers mounted thereon like said rollers aforesaid and mounted in and projecting through a top side portion of said end plates, said rollers on said feed shafts interlocking in like manner with the rollers on the next adjacent shaft, said rollers on one of said feed shafts in like close proximity with said rollers of the other feed shaft, an inside and an outside opposed ejection shafts having spaced rollers mounted thereon like said rollers aforesaid and mounted in and projecting through the other top side portion of said end plates, said rollers on said ejection shafts interlocking in like manner with the rollers on the next adjacent shaft, said rollers on one of said ejection shafts in like close proximity with said rollers of the other ejection shaft, every other one of the projecting end portions of the shafts in each end of said transport mechanism having a sprocket removably mounted thereon and secured thereto to turn the shaft, a drive shaft mounted between said end plates and projecting through same, said drive shaft mounted in the top portion of said end plates and positioned in same above one inside leg of said last-named U-shaped pattern, another drive shaft mounted between said end plates and projecting through same, said last-named drive shaft mounted in the top portion of said end plates and positioned in same above the other inside leg of said last-named U-shaped pattern, each of said drive shafts having a separable coupling mounted on one projecting end portion thereof, a first drive sprocket mounted adjacent to said coupling on the inside thereof, a second drive sprocket mounted inside of and adjacent to said first sprocket, a third drive sprocket mounted on the other projecting end portion of said drive shafts, a chain drivingly mounted on the said third drive sprockets and the sprockets mounted on the ends of the shafts projecting through one of the end plates, another corresponding chain drivingly mounted on the said second drive sprockets and the sprockets mounted on the ends of the shafts projecting through the other of the said end plates, to rotate all of the shafts, with the shafts on the inside U-shaped pattern rotating in an opposite direction from rotation of the shafts of the outside U-shaped pattern, a chain drivingly mounted on the said first drive sprockets and the sprockets mounted on the projecting ends of the said feed shafts and the said ejection shafts to rotate one of said feed shafts in the opposite direction from the rotation of other feed shaft, and to rotate one of said ejection shafts in the opposite direction from the rotation of the other ejection shaft, drier gearing mounted on said drier unit, said gearing drivingly connected by a separable coupling to the said gearing mounted on the said tank unit, said couplings mounted on the ends of said drive shafts drivingly connected to said drier gearing, another like removably mounted film drier transport mechanism constructed, driven and geared in like manner, mounted in series in said drier unit immediately adjacent to the other drier transport mechanism, the rollers of said outside ejection shaft of the first drier transport mechanism interlocking in like manner with the rollers of said outside feed shaft of the second adjacent drier transport mechanism, a crossover shaft having spaced rollers mounted thereon removably mounted between adjacent end plates of the drier transport mechanisms and on adjacent outside feed and ejection rollers and interlocking in like manner the rollers of said adjacent inside feed and inside ejection roller shafts of said adjacent drier mechanisms, drier means spaced between the legs of the U-shaped pattern, said drier unit mounted to said tank unit, the rollers of the said outside ejection shaft of the said transport mechanism mounted in said wash tank interlocking in like manner the rollers of the said outside feed shaft of the adjacent drier transport mechanism, a crossover shaft having spaced rollers mounted thereon removably mounted between adjacent end plates of said transport mechanism mounted in said wash tank and the end plates of said adjacent drier transport mechanism and on the said last-name adjacent outside feed and ejection rollers and interlocking in like manner the rollers of said adjacent inside feed and inside ejection roller shafts of said adjacent transport and drier transport mechanisms, said machine for processing exposed gelatin-coated film or photographic paper constructed and adapted to process said film or paper bypassing film or paper from said feed modular unit by said film transport mechanisms through said developing tank, across into said hypo tank and through same, across into said wash tank and through same, and across into said drier unit and through same, ejecting said film or paper therefrom dried and processed.

2. The machine as defined in claim 1 wherein said tank modular unit comprises, in combination, and in addition, in series a short-stop fix tank between said developing tank and said hypo tank and having like drain means, aerating means, aerating connecting means, film transport means and crossover means between same and said developing tank and between said short-stop fix tank and said hypo tank, said machine constructed and adapted for processing photographic film or paper.

3. A machine suitable for processing exposed gelatin-coated film or photographic paper comprising, a plurality of modular units operatively, interchangeably and detachably connected in series having a feed unit, said feed unit having a motor drivingly connected to a shaft and gear means, a tank modular unit having a developing tank, a hypo tank and a wash tank mounted therein in series and each of said tanks having a removably mounted transport mechanism mounted therein, said mechanism having two end plates, a plurality of horizontally disposed shafts mounted between and projecting through said end plates, a plurality of spaced rollers mounted on each of said shafts to turn therewith some of said shafts and rollers positioned generally in an elongated symmetrical U-shaped pattern near the outside edge of said end plates, the rollers of each shaft of said U-shaped pattern being in spaced interlocking relation with rollers of each adjoining shaft, an inside vertical row of others of said shafts and rollers centered between and in staggered relation to said shafts and rollers of both legs of the said U-shaped pattern, the face of each roller on said inside shafts being in close proximity with the face of the roller of an outside shaft, said rollers on the said inside shafts spaced in interlocking position with the rollers on each adjoining shaft on said inside row, two spaced directing shafts with like spaced rollers mounted thereon interlockingly and opposedly mounted between said end plates in the top portion thereof, opposed feed shafts with like spaced rollers mounted thereon interlockingly mounted between said end plates in an upper side portion thereof, and two opposed ejection shafts with like spaced rollers mounted thereon interlockingly mounted between said end plates in the other upper side portion thereof, at least one drive shaft, sprocket means mounted on said shafts, chain means drivingly mounted on said sprocket means, coupling means connecting said drive shaft to gearing, said gearing drivingly connected to said gear means to rotate all the shafts, in operation the shafts of inside vertical rows rotating in a direction opposite from the rotation of the shafts of said U-shaped pattern, said tanks with said transport mechanism mounted therein positioned immediately adjacent to each other in said modular unit, the rollers of outside ejection shaft interlocking with rollers of the outside feed shaft of adjacent transport mechanisms, a crossover shaft with rollers mounted thereon interlocking with feed and ejection shaft rollers of adjacent transport mechanisms, and drier means mounted adjacent to said tank unit, said machine constructed and adapted to process photographic film or paper by passing same from said feed unit by said transport mechanisms through said developing tank, across into said hypo tank and through same, across into said wash tank and through same and across into said drier means, said drier means receiving wet processed film or paper from the said film transport mechanism of said adjacent tank unit and drying same.

4. A machine for processing exposed gelatin-coated film or photographic paper comprising, a plurality of modular units operatively, interchangeably and detachably connected in series, a frame, panels monuted on said frame, and adjustable legs mounted on said frame and supporting said unit, one of the modular units being a feed unit having a motor drivingly connected to a shaft and gear means, an aeration timing assembly, heating and cooling means and electrical means, another of the modular units being a tank modular unit having a removable light tight cover, and tanks for processing photographic film or paper operatively mounted in series, each of said tanks having drain means and a removably mounted photographic film or paper transport mechanism mounted therein having two vertically segmented end plates having at least four interlocking and overlapping tab segments removably connected by screw means and supporting, when so connected, a plurality of horizontally disposed hollow shafts mounted between and projecting through said end plates, said end plates connected by rods mounted thereon, a plurality of spaced rollers concentrically mounted on each of said shafts to turn therewith, said shafts with rollers positioned generally in an elongated symmetrical U-shaped pattern in said end plates, with said rollers of each shaft in spaced interlocking relation with the rollers of each adjoining shaft, thereby the rollers on each shaft projecting into the spaces between the rollers on each adjoining shaft, and the shafts along the legs of said U being directly opposed to each other in horizontal relation, an inside vertical row of like spaced shafts having like and spaced rollers concentrically mounted thereon and centered between the legs of said U-shaped pattern and centered on horizontal planes drawn midway between the center lines of each of the said shafts having rollers spaced in the said U-shaped pattern, the face of each roller on said center shaft being in close proximity with the face of the roller on an outside shaft, and each of said rollers mounted on the said inside shafts describing an arc in an imaginary vertical plane drawn tangent to the innermost points of the circle described by the rollers mounted on the said outside shafts, said rollers on the said inside vertical row of shafts spaced in interlocking position with the rollers on each adjoining shaft on said inside row, the rollers on each of said shafts projecting into the spaces between the rollers on each adjoining shaft of said vertical row, two spaced directing shafts having like spaced rollers mounted thereon like the rollers aforesaid symmetrically mounted near the top portion of said end plates in directly opposed horizontal relation, said rollers on the said directing shafts interlocking in like manner with the rollers mounted on the top most shaft of the said inner vertical row and in like close proximity with the top most mounted shafts of the said U-shaped pattern, an outside and an inside opposed feed shaft having spaced rollers mounted thereon like said rollers aforesaid and mounted between said end plates in the top side portion of same, said rollers on said feed shafts interlocking in like manner with the rollers on the next adjacent shaft, said rollers on one of said feed shafts in like proximity with said rollers of the other feed shaft, an inside and an outside opposed ejection shaft having spaced rollers mounted thereon like said rollers aforesaid and mounted between said end plates in the other topside portion of said end plates, said rollers on said ejection shafts interlocking in like manner with the rollers of the next adjacent shaft, said rollers on one of said ejection shafts in like close proximity with said rollers of the other ejection shaft, every other one of the projecting end portions of the shafts in each end of said transport mechanism having a sprocket removably mounted thereon and secured thereto to turn the shaft, at least one drive shaft mounted between said end plates in the top portion thereof and projecting through same, a separable coupling mounted on one projecting end of said drive shaft, a first drive sprocket mounted adjacent to said coupling on the inside thereof, a second drive sprocket mounted adjacent to said first drive sprocket, a third drive sprocket mounted on the other end of said drive shaft, at least one chain drivingly mounted on said third drive sprocket and the sprockets on the ends of the shafts projecting through one of the end plates, at least one corresponding chain drivingly mounted on the sprockets mounted on the ends of the shafts projecting through the other of the end plates and said second drive sprocket, to rotate all of the shafts, with the shafts of the inside vertical rows rotating in an opposite direction from the rotation of the shafts of a said U-shaped pattern, at least one chain drivingly mounted on the said first drive sprocket and the sprockets mounted on the projecting ends of the said feed shafts and the said ejection shafts to rotate one of said feed shafts in a direction opposite to the direction of rotation of the other feed shafts, and to rotate one of said ejection shafts in a direction opposite to the direction of rotation of the other ejection shaft, gearing mounted on said tank unit, said gearing drivingly connected to said gear means of said feed unit, said coupling means drivingly connected to said gearing of said tank unit, said tanks with said transport mechanism mounted therein positioned immediately adjacent to each other in said modular unit, the rollers of said outside ejection shafts interlocking in like manner with the rollers of said outside feed shaft of the adjacent transport mechanism, a crossover shaft having spaced rollers mounted thereon removably mounted between adjacent end plates of transport mechanisms and on adjacent outside feed and ejection rollers and interlocking in like manner with the rollers of said adjacent inside feed and inside ejection roller shafts of adjacent film transport mechanisms, a drier modular unit for producing matte photographic reproductions having a motor mounted thereon, an air blower mounted thereon, said air blower drivingly connected to said motor, means to conduct air to film or paper for drying same, a removably mounted film transport drier mechanism having two end plates supporting a plurality of horizontally disposed shafts mounted between and projecting through said end plates, a plurality of spaced rollers concentrically mounted on each of said shafts to turn therewith, said shafts having said rollers positioned in two adjacent rows in a U-shaped pattern near the outside edge of said end plates, the rollers of each of said shafts having said rollers in spaced interlocking relation with the rollers of each adjoining shaft in its row thereby the rollers on each shaft in a row projecting into the spaces between the rollers on each adjoining shaft in said row, the rows of shafts positioned in close proximity and in staggered relation to each other, each of the said rollers mounted on shafts in one row describing an arc in an imaginary plane drawn tangent to the nearest points of the circles described by the rollers of the shafts of the said adjacent row, two spaced shafts having spaced rollers mounted thereon like the rollers aforesaid and positioned in the top portion of said end plates and mounted in and projecting through said end plates in directly opposed horizontal relation, the rollers of one of said last-named shafts interlocking in like manner with the rollers of one of the topmost mounted shafts of the inside U-shaped pattern and the rollers of the other of the last-named shafts interlocking in like manner with the rollers of the other of the topmost mounted shafts of the said inside U-shaped pattern, an inside and an outside opposed feed shaft having spaced rollers mounted thereon like said rollers aforesaid and mounted in and projecting through a top side portion of said end plates, said rollers on said feed shafts interlocking in like manner with the rollers on the next adjacent shaft, said rollers on one of said feed shafts in like close proximity with said rollers of the other feed shaft, an inside and an outside opposed ejection shaft having spaced rollers mounted thereon like said rollers aforesaid and mounted in and projecting through the other top side portion of said end plates, said rollers on said ejection shafts interlocking in like manner with the rollers on the next adjacent shaft, said rollers on one of said ejection shafts in like close proximity with said rollers of the other ejection shaft, every one of the projecting end portions of the shafts in each end of said transport mechanism having a sprocket removably mounted thereon and secured thereto to turn the shaft, a drive shaft mounted between said end plates and projecting through same, said drive shaft mounted in the top portion of said end plates and positioned in same above one inside leg of said last-named U-shaped pattern, another drive shaft mounted between said end plates and projecting through same, said last-named drive shaft mounted in the top portion of said end plates and positioned in same above the other inside leg of said last-named U-shaped pattern, each of said drive shafts having a separable coupling mounted on one projecting end portion, a first drive sprocket mounted adjacent to said coupling on the inside thereof, a second drive sprocket mounted inside of and adjacent to said first sprocket, a third drive sprocket mounted on the other end portion of said drive shaft, a chain drivingly mounted on the said third drive sprockets and the sprockets mounted on the ends of the shafts projecting through one of the end plates, another corresponding chain drivingly mounted on the said second drive sprockets and the sprockets mounted on the ends of the shafts projecting through the other of the said end plates, to rotate all of the shafts, the shafts of the inside U-shaped pattern rotating in an opposite direction from rotation of the shafts of the outside U-shaped pattern, a chain drivingly mounted on the said first drive sprocket and the sprockets mounted on the projecting ends of the said feed shafts and the said ejection shafts to rotate one of said feed shafts in the opposite direction from the rotation of the other feed shaft, and to rotate one of said ejection shafts in the opposite direction from the rotation of the other ejection shaft, drier gearing mounted on said drier unit, said gearing drivingly connected by a separable coupling to the said gearing mounted on the said tank unit, said couplings mounted on the ends of said drive shafts drivingly connected to said drier gearing, another like removably mounted film drier transport mechanism driven and geared in like manner, mounted in series in said drier unit immediately adjacent to the first-named drier transport mechanism, the rollers of said outside ejection shaft of the first drier transport mechanism interlocking in like manner with the rollers of said outside feed shaft of the second adjacent drier transport mechanism, a crossover shaft having spaced rollers mounted thereon removably mounted between adjacent end plates of the drier transport mechanisms and on adjacent outside feed and ejection rollers and interlocking in like manner the rollers of said adjacent inside feed and inside ejection roller shafts of said adjacent drier mechanisms, film drier means spaced between the legs of the said U-shaped pattern, said drier unit mounted to the adjacent modular unit, the rollers of a said outside ejection shaft of the said transport mechanism mounted in said adjacent modular unit interlocking in like manner the rollers of the said outside feed shaft of said first drier transport mechanism, a crossover shaft having spaced rollers mounted thereon removably mounted between adjacent end plates of said transport mechanism mounted in said adjacent modular unit and the end plates of said first drier transport mechanism and on the said last-named adjacent outside feed and ejection rollers and interlocking in like manner the rollers of said adjacent inside feed and inside ejection roller shafts of said adjacent transport and drier transport mechanisms, said machine constructed and adapted for processing exposed gelatin-coated film or photographic paper by passing film or paper from said feed modular unit by said film transport mechanisms into said tank modular unit and through same, and across into said drier unit and through same, ejecting said film or paper therefrom dried and processed.

5. The machine as defined in claim 4 wherein said tank modular unit has in series a developing tank, a short stop fix tank and a hypo tank, each of said tanks having aerating means, and means connecting said aerating means and said aeration timing assembly, and said timing assembly constructed and adapted to activate said aerating means, a second tank modular unit in combination and in addition and mounted on said last-named tank unit in series between said last-named tank unit and said drier unit, said second tank modular unit having a like tank with crossover means connecting same to the adjacent tank unit and like film transport means removably mounted therein, said tank containing a hypo eliminator solution, and having like aerating means, drain means, aeration connecting means and crossover means operably connecting same to a three-pass wash tank mounted in said second modular tank unit, said three-pass wash tank having drain means, wash means and a film transport mechanism mounted therein, said film transport mechanism having additional rows of like shafts with rollers mounted in like vertical rows and U-shaped patterns, adjoining U-shaped patterns having a common leg, like directing shafts spaced in like manner, and driving means to rotate said shafts in like manner, said mechanism constructed and adapted to pass photographic film or paper through said wash tank in three passes and out through said ejection means into said drier modular unit through crossover means, said machine constructed and adapted to process photographic film or paper by passing said film or paper from said feed unit through said tank units and through said drier mechanisms and eject same therefrom dried and processed.

6. The machine as defined in claim 4 wherein said tank modular unit has a wash tank, a short stop fix tank, and another wash tank, said wash tanks having wash means therewith, and in combination and in addition a second tank modular unit connected in series between said feed unit and said tank unit, said second unit having mounted therein a three-pass developer tank and a short stop fix tank, said tanks having like drain means, like aerating means, like transport mechanism, means to connect said aerating means, and crossover means between said short stop fix tank and said first-named wash tank of said tank unit, said three-pass developer tank having a like film transport mechanism, said mechanism having in addition and in combination additional rows of like shafts with like spaced rollers mounted thereon, said shafts mounted in like vertical rows and U-shaped patterns, said rollers interlocking and in close proximity with adjacent rollers adjoining U-shaped patterns having a common leg, like directing shafts spaced in like manner, like driving means turning said shafts in like manner, said mechanism transporting photographic film or paper through said developing tank in three passes and out through said ejection means through crossover means into said short stop fix tank, a third tank modular unit mounted in series and connected to said tank unit and having two two-pass tanks mounted in series therein, each of said tanks having like drain means, and like removably mounted transport mechanisms mounted therein, said film transport mechanism having additional rows of like shafts with rollers mounted in like vertical rows and U-shaped patterns, adjoining U-shaped patterns having a common leg, like directing shafts spaced in like manner, and like driving means rotating said shafts in like manner, said mechanism constructed and adapted to transport photographic film or paper through said tanks in two passes, one of said two-pass tanks having hardener fix solution therein and mounted adjacent to the last-named wash tank in said tank unit, crossover means between said last-named tanks, the other two-pass tank mounted immediately adjacent and in series with the said hardener fix tank and having like crossover means between same, drain means, wash means, and like two-pass film transport mechanism, and a like modular unit having a like two-pass tank mounted in one portion thereof and a like film drier transport mechanism mounted in the other portion thereof, said modular unit mounted in series and adjacent to the last-named modular unit, said last-named two-pass tank having crossover means to the last-named wash tank in the adjacent modular unit, aerating means, drain means, like two-pass film transport means, said last-named two-pass tank having a buffer stabilizer photographic solution therein, said drier film transport means mounted in the other portion of the said last-named modular unit having drier means mounted between the legs of the said U-shaped pattern, crossover means between same and said last-named two-pass tank, and crossover means between said film drier transport mechanism and said drier modular unit, said machine constructed and adapted for processing color photographic film or paper by passing said film or paper from said feed unit through said tank units and through said drier mechanisms and eject same therefrom dried and processed.

7. A machine for processing exposed gelatin-coated film or photographic paper comprising a plurality of modular units operatively interchangeably and detachably connected in series and having a feed modular unit having a motor drivingly connected to shaft and gear means, at least one tank modular unit having tanks for processing photographic film or paper operatively mounted in series, each of said tanks having a removably mounted photographic film or transport mechanism mounted therein, said mechanism having two end plates supporting a plurality of horizontally disposed shafts mounted between and projecting through said end plates, a plurality of spaced rollers concentrically mounted on each of said shafts to turn therewith, outside shafts with rollers positioned generally in an elongated symmetrical U-shaped pattern in said end plates, with said rollers of each shaft in spaced interlocking relation with the rollers of each adjoining shaft, an inside vertical row of like shafts with rollers centered and in staggered relation to said shafts with rollers of the legs of the said U-shaped pattern, the face of each roller on said inside shafts being in close proximity with the face of the roller of an outside shaft, said rollers on the said inside shafts spaced in interlocking position with the rollers on each adjoining shaft on said inside row, two spaced directing shafts with rollers interlockingly and opposedly mounted in the top portion of said end plates, opposed feed shafts with rollers interlockingly mounted on the sides of said end plate near the top thereof and two opposed ejection shafts interlockingly mounted near the top of the other side portion of said end plate, sprocket means mounted on said shafts, chain means drivingly mounted on said sprocket means, gearing mounted on said tank unit, at least one drive shaft mounted between said end plates, coupling means connecting said drive shaft to said gearing, said gearing drivingly connected to said gear means to rotate all the shafts, the shafts of the inside vertical rows rotating in operation in opposite directions from the rotation of the shafts of the said U-shaped pattern, said tanks with said transport mechanism mounted therein positioned immediately adjacent to each other in said modular unit, outside ejection shaft rollers interlocking with outside feed shaft rollers of adjacent transport mechanism, a crossover shaft having rollers mounted thereon removably mounted between adjacent end plates of transport mechanisms and interlocking with adjacent feed and ejection rollers of adjacent transport mechanisms, and drier means mounted adjacent to said tank unit, said drier means receiving wet processed film from said film transport mechanism of said adjacent tank unit, and drying same.

8. The machine as defined in claim 7 wherein the said drier means consists of gloss type drier means wherein in operation the said photographic film or paper is ejected from the said wash tank and passed into the said drier means and dried therein to a gloss finish.

References Cited

UNITED STATES PATENTS

| | | | |
|---|---|---|---|
| 3,025,779 | 3/1962 | Russell et al. | 95—94 |
| 3,067,919 | 12/1962 | Kunz | 95—94 XR |
| 3,149,551 | 9/1964 | Cramer | 95—96 XR |

FOREIGN PATENTS

| | | |
|---|---|---|
| 501,235 | 2/1951 | Belgium. |
| 988,332 | 4/1965 | Great Britain. |

NORTON ANSHER, *Primary Examiner.*

FRED L. BRAUN, *Assistant Examiner.*